June 11, 1935.　　　　L. E. WELLS　　　　2,004,304
STORAGE BATTERY SEPARATOR
Filed Aug. 1, 1933

INVENTOR
LELAND E. WELLS
ATTORNEYS

Patented June 11, 1935

2,004,304

UNITED STATES PATENT OFFICE 2,004,304

STORAGE BATTERY SEPARATOR

Leland E. Wells, Cleveland Heights, Ohio, assignor to Willard Storage Battery Company, Cleveland, Ohio, a corporation of West Virginia Application August 1, 1933, Serial No. 683,149

3 Claims. (Cl. 136—145)

This invention relates to double separators for use in a storage battery between the flat positive and negative plates.

Single separators are generally employed, these separators having a more or less flat face which is adapted to bear against the negative plate and ribs or equivalent projections which bear against the positive plate, the ribs on the side of the positive plate providing for suitable circulation of electrolyte. The major portion of the separators in commercial use at the present time are formed of wood or are of the "Willard thread-rubber" type. In some few instances separators are made of other materials but are not used to any extent commercially.

With certain batteries, especially those used in what is known as "cycling" service, where it is desirable to support and restrain the active material of the positive as well as of the negative plates, double separators are commercially employed. Generally, these consist of a wood or thread-rubber separator of the conventional ribbed type on the ribbed side of which is placed a thin sheet of perforated vulcanized rubber. Other double separators have been proposed but they have been found to be impractical. The double separators which have gone into common use and which consist of a conventional ribbed wood or thread-rubber separator faced with a sheet of rubber are not entirely satisfactory because separators of this kind consist of two pieces which increase the cost of handling and assembly in the battery, and, furthermore, the openings in the rubber sheet, with the best manufacturing processes, are too large and not sufficiently numerous. A double separator of this type, therefore, has an undesirably high resistance, and, furthermore, the disintegrated active material will readily pass through the openings of the perforated rubber sheet.

The principal object of the present invention is to provide a practical and efficient double separator which overcome the objections to the double separators used heretofore.

In carrying out my invention, I provide a separator for use between flat battery plates consisting of two microporous inert diaphragm or separator walls spaced apart except where integrally attached at intervals so as to function, first as a mechanical support and restraint for the surfaces of both of the opposing electrodes, second, to provide space for the free circulation of electrolyte without washing the surfaces of the active material, and, third, to provide an electrolytic diaphragm in which the pores extending through each wall are discontinuous so that any "treeing" of active material through one of the walls will not extend through the other but will fall down in the interstices between the walls.

By the term "microporous wall" is meant an inert diaphragm or separator medium having a myriad of exceedingly small and uniformly spaced pores extending therethrough. For this purpose I may use separator sheets or material of the thread-rubber type or sheets made in accordance with the teachings of the Beckmann Patents No. 1,745,657 and No. 1,831,406. The separators of these types may be reenforced by a sheet of fabric in the manner described in an application filed in the name of Willard L. Reinhardt and Leland E. Wells, Serial No. 698,860, filed November 20, 1933, such a modified separator having substantially the desirable microporosity of the Beckmann separators but being less fragile.

The invention may be further briefly summarized as consisting in a novel construction of double separator hereinafter described and set forth in the appended claims.

In the accompanying sheet of drawings, wherein I have shown one embodiment of my invention, Fig. 1 is a face view of my improved separator;

This separator has two similar, opposed walls 10 and 11 arranged face to face. These are integral or united along their outer vertical edges, as shown at 12, and preferably also at regular intervals from the top to the bottom edges, as shown at 13. This forms between the junction lines 12 and 13 vertical spaces open at the top and bottom for the circulation of electrolyte between the two walls. I prefer to break up the walls between the junction lines 13 and 12 or 12 and 12 by small corrugations which may form vertical contacting lines, stiffen the separator, and increase the resistance to compression, and when the separators are composed in part of rubber, as is preferred, they prevent the flow of rubber and consequent glazing of the outer faces while being vulcanized in the vulcanizing mold.

Figure 2:
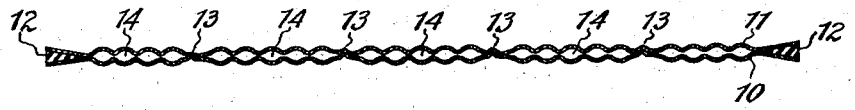
Fig. 2 is a transverse cross-sectional view.
Figure 3:
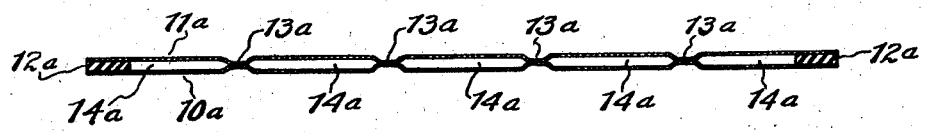
Fig. 3 is a fragmentary view similar to Fig. 2, but showing a modification.
Figure 1:
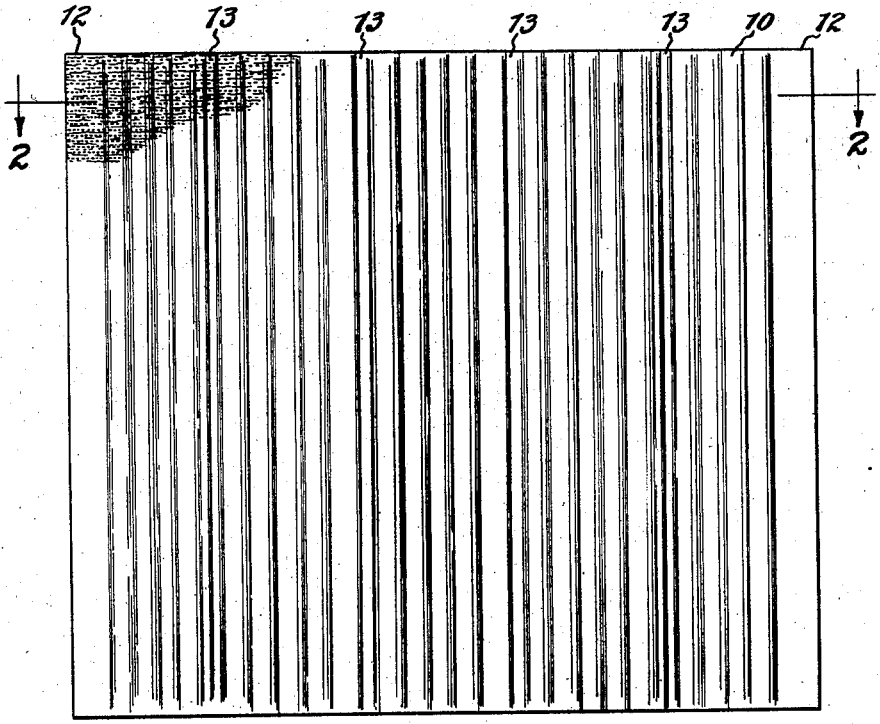

However in some instances the portions of the walls between adjacent junction lines may be flat or substantially so as shown in Fig. 3, wherein the walls are designated $10^a$ and $11^a$, the junction lines $12^a$ and $13^a$ and the inner circulation spaces $14^a$. It will be understood, however, the number and therefore spacing of the junction lines 13 of the corrugated form of Figs. 1 and 2 or of the junction lines 13ᵃ of Fig. 3 may be varied as desired or found necessary.

It will be understood that these separators are designed to be placed between the flat positive and negative battery plates and to contact the active material of the plates on both sides so as to hold it in place, the restraining action on the active material of the plate of one polarity being the same as that on the active material of the plate of the opposite polarity.

This double separator is preferably formed of two sheets or pieces of microporous material designed to be vulcanized together and thus integrally united along the junction lines 13 and along the outer vertical edges 12. To facilitate the joining along the outer vertical edges and to give the separator the desired thickness along these edges, strips of rubber may be placed between the edge portions and the whole vulcanized together. While different kinds of microporous sheets may be employed for this purpose, I prefer to form them of thread-rubber sheets such as described in the Willard Patents No. 1,243,368 and No. 1,243,370. I may, however, as already stated, use microporous sheets formed in accordance with the Beckmann and Reinhardt inventions already referred to, or other suitable microporous sheets, especially if they are formed in part of rubber, since the sheets can thereby be readily vulcanized together.

It will be understood that when using thread-rubber sheets consisting of rubber and threads, the latter are very closely arranged and extend transversely through the sheet providing minute but a great number of pores, as is typical of the thread-rubber separators, whereas with the Beckmann and Reinhardt sheets, the microscopic pores extend through the rubber.

In forming my improved double separator, I prefer to follow the process disclosed in the Willard Patent No. 1,243,371, in which event the two sheets of partially vulcanized thread-rubber or other suitable microporous material are placed in a mold with suitably shaped cores (round in the case of the Willard patent) but of generally flat but preferably corrugated shape in the present instance, placed between the sheets to form the circulation spaces, it being understood also that, in assembling the parts in the mold ready for vulcanization, rubber strips may be placed between the opposed edge portions, as already explained. Then when the mold is closed and is heated, the separator is completely vulcanized and the parts united, as shown and described herein. It is to be understood, however, that this separator, and particularly the circulation spaces, are used for an entirely different purpose than in the last mentioned Willard patent, for, in that patent, wherein the separator is composed of a series of round tubes, these tubes are for the purpose of receiving pencil electrodes, whereas the present separator is used between flat electrodes or plates to space them apart and also to retain the active material in the grids, and the inner cored spaces between the vertical junction lines are to provide spaces for the circulation of electrolyte between the two walls or surfaces which engage the active material of the flat plates.

With a double separator constructed as above described and formed as explained above, I obtain a commercially practical double separator which is far more satisfactory, from the standpoints of manufacture, assembly and efficiency than the separators which have been used or proposed for use heretofore.

It should be noted in passing that I have provided a double separator for use between flat electrodes with both walls formed of microporous material, but in which the pores, considered from the outer face of one separator to the other, are discontinuous so that even if there should be any "treeing" of active material through one wall, it will not extend through the other but will fall down in the interstices between the walls.

I might add in conclusion that when a separator is made in the manner explained above, the separator has considerably less resistance than two single ribbed separators, for, with the latter, the ribs cover or block an appreciable portion of what would otherwise be a porous area. However, with my separator only a minimum portion of the porous surface is covered by non-porous ribs.

I do not desire to be confined to the precise details shown, but aim in my claims to cover all modifications which do not involve a departure from the spirit and scope of my invention.

Having thus described my invention, I claim:

1. A substantially flat separator for use between flat battery plates comprising two corrugated porous sheets arranged in face-to-face relation and connected together along their outer upright edges and along spaced vertical lines between their outer upright edges, each sheet having between adjacent lines of jointure a series of corrugations forming a series of grooves and ridges with the ridges and grooves of one sheet opposite respectively the ridges and grooves of the other sheet thereby forming a plurality of circulation spaces between the lines of jointure both on the inner and outer sides of the sheets.

2. A substantially flat separator for use between flat battery plates comprising two similar porous sheets arranged in face to face relation and connected together along their outer upright edges, and between their outer upright edges, being in contact and joined together along spaced vertical lines the distance between which is greater than the thickness of the separator, there being upright circulation spaces between said vertical lines of jointure.

3. A substantially flat separator for use between flat battery plates comprising two similar porous sheets arranged in face to face relation and connected together along their outer upright edges, and between their outer upright edges, the sheets being in contact and joined together along spaced vertical lines the distance between which is greater than the thickness of the separator, and between said lines the sheets being spaced apart forming transversely elongated vertical circulation spaces.

LELAND E. WELLS.